(12) United States Patent
Milicevic et al.

(10) Patent No.: US 10,730,784 B2
(45) Date of Patent: Aug. 4, 2020

(54) METHOD FOR PREPARING A PRIMARY PREFORM BY ETCHING AND COLLAPSING A DEPOSITED TUBE

(71) Applicant: Draka Comteq B.V., Amsterdam (NL)

(72) Inventors: Igor Milicevic, Helmond (NL);
Johannes Antoon Hartsuiker, Eindhoven (NL); Gertjan Krabshuis, Sint Oedenrode (NL); Mattheus Jacobus Nicolaas Van Stralen, Tilburg (NL)

(73) Assignee: Draka Comteq B.V., Amsterdam (NL)

( * ) Notice: Subject to any disclaimer, the term of this patent is extended or adjusted under 35 U.S.C. 154(b) by 13 days.

(21) Appl. No.: 15/207,548

(22) Filed: Jul. 12, 2016

(65) Prior Publication Data
US 2017/0015581 A1   Jan. 19, 2017

(30) Foreign Application Priority Data
Jul. 13, 2015 (NL) ..................................... 2015161

(51) Int. Cl.
*C03B 37/018* (2006.01)
*C03B 37/012* (2006.01)

(52) U.S. Cl.
CPC .. *C03B 37/01228* (2013.01); *C03B 37/01248* (2013.01); *C03B 37/01861* (2013.01); *C03B 37/01869* (2013.01)

(58) Field of Classification Search
CPC .................................. C03B 37/012–37/01297
See application file for complete search history.

(56) References Cited

U.S. PATENT DOCUMENTS

| | | | | |
|---|---|---|---|---|
| 4,199,337 A * | 4/1980 | Asam | ..................... | C03B 37/014 65/31 |
| 4,737,179 A * | 4/1988 | Tanaka | ............... | C03B 37/01211 65/415 |
| 4,746,345 A * | 5/1988 | Pluijms | ................. | C03B 23/043 65/108 |
| 4,775,401 A * | 10/1988 | Fleming | ............ | C03B 37/01211 65/395 |
| 4,793,843 A | 12/1988 | Pluijms et al. | | |
| 4,846,867 A * | 7/1989 | Yokota | ............... | C03B 37/01211 65/397 |
| 4,854,956 A | 8/1989 | Pluijms et al. | | |
| 5,000,771 A * | 3/1991 | Fleming, Jr. | ....... | C03B 37/01205 216/67 |
| 5,059,229 A * | 10/1991 | Blankenship | ......... | C03B 37/029 65/32.5 |
| 5,397,372 A * | 3/1995 | Partus | ............... | C03B 37/01815 65/391 |
| 5,540,059 A * | 7/1996 | Yokokawa | ........ | C03B 37/01413 141/11 |
| 5,970,083 A | 10/1999 | Orcel et al. | | |
| 6,105,396 A * | 8/2000 | Glodis | .............. | C03B 37/01211 65/377 |
| 6,460,378 B1 * | 10/2002 | Dong | ................ | C03B 37/01211 65/412 |
| 7,058,269 B2 * | 6/2006 | Caron | ............... | C03B 37/01205 385/123 |
| 7,089,765 B2 * | 8/2006 | Schaper | ............ | C03B 37/01205 65/397 |
| 7,486,862 B2 * | 2/2009 | Ohga | ................ | C03B 37/01211 385/123 |
| 8,798,412 B2 * | 8/2014 | Bookbinder | ...... | C03B 37/01211 385/126 |
| 2004/0159124 A1 * | 8/2004 | Atkins | .............. | C03B 37/01211 65/391 |
| 2005/0284184 A1 * | 12/2005 | Baynhann | ............. | C03B 37/018 65/391 |
| 2006/0191294 A1 * | 8/2006 | Ganz | ................... | C03B 19/1453 65/404 |
| 2006/0230793 A1 * | 10/2006 | Hong | .................... | C03B 37/018 65/417 |
| 2007/0044516 A1 * | 3/2007 | Taru | ........................ | C03B 32/00 65/412 |

(Continued)

FOREIGN PATENT DOCUMENTS

| | | |
|---|---|---|
| EP | 0117009 A1 | 8/1984 |
| JP | 01-183433 A | 7/1989 |
| KR | 2005-0032891 A | 4/2005 |
| WO | 02/40415 A1 | 5/2002 |
| WO | 2004/043870 A1 | 5/2004 |

OTHER PUBLICATIONS

Extended Search Report in counterpart European Application No. 16175188.8 dated Jan. 30, 2017, pp. 1-6 [U.S. Pat No. 5,970,083 previously cited.].

*Primary Examiner* — John M Hoffmann
(74) *Attorney, Agent, or Firm* — Additon, Higgins & Pendleton, P.A.

(57) ABSTRACT

An exemplary method for preparing a primary preform by etching and collapsing a deposited tube includes mounting a deposited tube on a lathe and introducing the deposited tube into a central aperture of a furnace mounted on the lathe, wherein the furnace and the deposited tube are movable in axial direction with respect to each other, and creating within the furnace a hot zone that moves in translation back and forth over the length of the deposited tube during one or more cycles, wherein (i) during at least one cycle at least part of the outside of the deposited tube is etched by supplying a fluorine-containing etching gas to an annular region between the outer surface of the deposited tube and the central aperture of the furnace, and (ii) during at least one cycle the deposited tube is collapsed.

21 Claims, No Drawings

(56) References Cited

U.S. PATENT DOCUMENTS

| | | | | |
|---|---|---|---|---|
| 2008/0028799 A1* | 2/2008 | Kwon | ............... | C03B 37/01807 |
| | | | | 65/417 |
| 2012/0291494 A1* | 11/2012 | Ishihara | .............. | C03B 367/018 |
| | | | | 65/421 |
| 2012/0301093 A1* | 11/2012 | Sillard | ............... | G02B 6/03666 |
| | | | | 385/126 |
| 2014/0270665 A1* | 9/2014 | Alonzo | ............ | C03B 37/01262 |
| | | | | 385/123 |
| 2015/0043880 A1* | 2/2015 | Brehm | .............. | C03B 37/01211 |
| | | | | 385/128 |
| 2017/0015581 A1 | 1/2017 | Milicevic et al. | | |

* cited by examiner

METHOD FOR PREPARING A PRIMARY PREFORM BY ETCHING AND COLLAPSING A DEPOSITED TUBE

CROSS-REFERENCE TO PRIORITY APPLICATION

This application claims the benefit of pending Dutch Application No. 2015161 (filed Jul. 13, 2015, at the Dutch Patent Office), which is hereby incorporated by reference in its entirety.

FIELD OF THE INVENTION

The present invention relates to a method for preparing a primary preform by etching and collapsing a deposited tube. The present invention further relates to the primary preform thus obtained and to a final preform and optical fibers obtained therefrom. The present invention still further relates to the field of optical fibers, particularly the field of manufacturing optical fibers by means of chemical vapor deposition (CVD) in which layers of silica are deposited on a substrate, such as modified chemical vapor deposition (MCVD), plasma-enhanced chemical vapor deposition (PECVD or PCVD), and outside vapor deposition (OVD).

BACKGROUND

Primary preforms are used to make optical fibers, and related processes for manufacturing primary preforms are known.

For example, U.S. Pat. No. 5,970,083, which is hereby incorporated by reference in its entirety, discloses a collapsing device comprising a graphite furnace that surrounds a cylindrical envelope, with a carrier tube being movable within the cylindrical envelope in the longitudinal direction thereof. The device is used for collapsing a hollow rod approximately 30 millimeters in diameter, which must be transformed into a preform that can be used for drawing the optical fiber (i.e., a solid rod having a diameter of approximately 20 millimeters). This transformation occurs principally towards the middle of the furnace (a hot zone), where a temperature of approximately 2000° C. prevails. The cylindrical envelope comprises an inlet opening and an outlet opening, both openings including two rings of conduits through which a non-oxidizing gas is passed. The annular conduits are inclined at an angle to the axial direction of the envelope, and the non-oxidizing gas is injected in two conical gas curtains by the annular conduits. The gas that is thus injected is directed away from the envelope, such that any entry into the envelope of air that could cause combustion of the graphite furnace is prevented.

A disadvantage of this method is that impurities that are present on the outside of the deposited tube (e.g., in the form of soot) and/or that are introduced during the collapsing process are incorporated into the outer glass layers of the primary preform during the collapsing step. Soot may also form bubbles during the collapsing process, which is undesirable. Therefore, there is a need for an improved collapsing method that provides primary preforms having a reduced contamination content.

SUMMARY

The present invention embraces a method for collapsing a deposited tube into a primary preform having reduced contamination.

The present invention further embraces a modified collapsing process that provides improved quality of primary preforms without the need of extensive modification to the apparatuses used.

A process to manufacture optical fibers generally includes at least the following four steps: In a first step, a hollow tube (also called substrate tube) is subjected to an inside vapor deposition process to provide a deposited tube. In a second step—the step to which the method according to the present invention mostly relates—the deposited tube is converted into a solid rod, a so-called "primary preform," by heating the deposited tube until it contracts and closes the central cavity. In a third step, the primary preform thus obtained is converted into a so-called "final preform" by increasing its diameter through the application of an external layer of silica. In a fourth step, optical fibers are drawn from the primary preform or final preform.

As discussed (above), typically after a hollow tube of vitrified silica layers has been obtained (the first step), the deposited tube is subsequently contracted by heating ("collapsing") into a solid rod—the primary preform (the second step). In an embodiment, vitrified silica layers are deposited onto the interior of a hollow silica tube and the tube comprising the vitrified silica layers is subsequently contracted by heating. In another embodiment, the hollow tube used as a substrate for the vitrified silica layers is first removed from the vitrified silica layers prior to the contraction by heating. In yet another embodiment, non-vitrified silica layers are deposited on the outer surface of a cylindrical mandrel. After removal of the mandrel, the non-vitrified silica is vitrified and subsequently contracted by heating. In each of these embodiments, a solid rod is obtained.

The present invention is related to a method of collapsing. The primary preform obtained after collapsing may furthermore be externally provided with an additional amount of glass to increase the diameter thereof. This can be achieved by means of an external vapor deposition process or a direct glass overcladding (so-called "overcladding"), or by using one or more preformed glass tubes (so-called "sleeving"), to obtain a final preform (third step). From the final preform thus produced, one end of which is heated, optical fibers are obtained by drawing on a drawing tower (fourth step). The refractive index profile of the consolidated (final) preform corresponds to the refractive index profile of the optical fiber drawn from such a preform.

In one aspect, the present invention relates to a method for preparing a primary preform by etching and collapsing a deposited tube. An exemplary method to obtain a primary preform includes mounting a deposited tube on a lathe and introducing the deposited tube into a central aperture of a furnace mounted on the lathe, wherein the furnace and the deposited tube are movable in axial direction with respect to each other, and creating within the furnace a hot zone that moves in translation back and forth over the length of the deposited tube during one or more cycles, wherein (i) during at least one cycle at least part of the outside of the deposited tube is etched by supplying a fluorine-containing etching gas to an annular region between the outer surface of the deposited tube and the central aperture of the furnace, and (ii) during at least one cycle the deposited tube is collapsed.

In an embodiment, the method comprises at least two cycles and typically between three and five cycles. At least one of the cycles is a collapsing cycle, and at least one of the cycles is an etching cycle. In another embodiment, at least one of the cycles, and typically all of the cycles, are collapsing and etching cycles.

In another embodiment, the fluorine-containing gas (e.g., the fluorine-containing etching gas) is supplied during at least one cycle, typically during all of the cycles.

In another embodiment, the fluorine-containing gas is supplied during the full cycle (i.e., during the total duration of a cycle). In another embodiment, the fluorine-containing gas is supplied during part of the cycle (e.g., during only part of the total duration of the cycle).

In another embodiment, the fluorine-containing etching gas is $C_2F_6$, $C_4F_8$, $CF_4$, $CCl_2F_2$, $SF_6$, $NF_3$, or $F_2$, or a combination of one or more of these gases. Typically, the fluorine-containing etching gas is $C_2F_6$. Other known fluorine-containing gases also may be used.

In another embodiment, the fluorine-containing gas is substantially free of molecular oxygen ($O_2$), typically having an oxygen content of less than 1 ppm.

In another embodiment, the fluorine-containing gas is mixed with an inert gas, such as argon.

In another embodiment, the fluorine-containing gas and the inert gas are both substantially free of molecular oxygen ($O_2$), typically having an oxygen content of less than 1 ppm.

In another embodiment, the annular region is substantially free of molecular oxygen ($O_2$) during the cycles, typically having an oxygen content of less than 100 ppm, more typically less than 10 ppm.

In another embodiment, the translation speed of the furnace with respect to the deposited tube is between 15 and 45 millimeters per second, more typically between 25 and 35 millimeters per second.

In another embodiment, the deposited tube is prepared by inside chemical vapor deposition on a hollow tube (i.e., on a substrate tube), typically a glass tube, more typically a quartz tube.

In another embodiment, the temperature of the hot zone during an etch cycle in which the outside of the deposited tube is etched is at least 1400° C., typically at least 1500° C.

In another embodiment, the temperature of the hot zone during a collapsing cycle in which the deposited tube is collapsed is at least 1700° C., typically at least 1800° C., and more typically at least 1900° C.

In another embodiment, the temperature of the hot zone during an etching and collapsing cycle in which the deposited tube is simultaneously etched and collapsed is at least 1700° C., typically at least 1800° C., and more typically at least 1900° C.

In another aspect, the present invention relates to a primary preform that is obtained by or is obtainable by the method according to the invention.

In another aspect, the present invention relates to a method of manufacturing an optical fiber by preparing a final preform from the primary preform according to the present invention and subsequently drawing the final preform into an optical fiber.

In another aspect, the present invention relates to an optical fiber that is obtained by or is obtainable by the method of manufacturing an optical fiber according to the invention.

The foregoing illustrative summary, as well as other exemplary objectives and/or advantages of the invention, and the manner in which the same are accomplished, are further explained within the following detailed description.

DETAILED DESCRIPTION

The present invention embraces methods for preparing primary preforms by etching and collapsing deposited tubes. In this regard, the following definitions are used in the present description and claims to describe the disclosed subject matter. Other terms not cited (below) are meant to have the generally accepted meaning in the field.

"substrate tube" or "hollow tube" as used in the present description means: a hollow elongated tube, which has a cavity within, used for inside chemical vapor deposition.

"deposited tube" as used in the present description means: a tube comprising or being made of vitrified silica layers, wherein at least some of the vitrified silica layers comprise a dopant. An exemplary deposited tube according to the present invention comprises a hollow tube in which several vitrified silica layers are provided upon the inside surface thereof. In this case, both the hollow tube as well as the vitrified silica layers applied during the inside chemical vapor deposition process make up the deposited tube. An exemplary deposited tube according to the present invention also comprises a design in which the hollow tube—on the inside surface of which several vitrified silica layers have been provided—has been removed. In that case, only the vitrified silica layers applied during the inside chemical vapor deposition process—but not the substrate tube—make up the deposited tube. An exemplary deposited tube according to the present invention also comprises a design in which non-vitrified silica layers are deposited on the outer surface of a cylindrical mandrel. After removal of the mandrel, the non-vitrified silica is vitrified by heating. A deposited tube may include handles in the form of tubes at one or both ends of the deposited tube.

"primary preform" as used in the present description means: a solid rod obtained by collapsing a deposited tube.

"final preform" as used in the present description means: a solid rod obtained by externally providing a primary preform with extra glass.

"inner surface" as used in the present description means: the inside surface or interior surface of the substrate tube.

"outer surface" as used in the present description means: the outside surface or exterior surface of the deposited tube.

"glass" or "glass material" as used in the present description means: crystalline or vitreous (glassy) oxide material—e.g., silica ($SiO_2$) or quartz—deposited by means of a vapor deposition process.

"silica" as used in the present description means: any substance in the form of $SiO_x$, whether or not stoichiometric, and whether or not crystalline or amorphous, possibly including dopants.

"dopant" as used in the present description means: a compound or composition that is present in the glass of the optical fiber and that has an effect of the refractive index of the glass. It can be, for example, a down-dopant (i.e., a dopant decreasing the refractive index), such as fluorine or boron. It can be, for example, an up-dopant (i.e., a dopant increasing the refractive index), such as germanium. Dopants can be present in the glass either in the interstices of the glass (e.g., in the case of fluorine) or as an oxide (e.g., in the case of germanium, aluminum, phosphorus or boron).

"the furnace and the deposited tube are movable in axial direction with respect to each other" as used in the present description means: that the furnace may move in axial direction over the deposited tube and/or that the deposited tube moves in axial direction inside the central aperture of the furnace. In other words, the furnace and the deposited tube move relative to each other. Typically, the furnace moves over the deposited tube.

"hot zone" as used in the present description means: a zone inside the furnace that has a high temperature. The hot zone includes part of the length of the deposited tube affected by the heat of the furnace. The hot zone is typically located in the middle of the furnace in axial direction.

"a hot zone that moves in translation back and forth over the length of the tube" as used in the present description means: that the hot zone moves back and forth by the movement of the furnace over the deposited tube and/or by the movement of the deposited tube inside of the central aperture of the furnace. For example, even if the furnace—and thus the hot zone within it—is considered stationary and the deposited tube moves, this is considered to be a hot zone moving in translation back and forth according to the present invention.

"moved back and forth" as used in the present description means: a reciprocating movement, or moving backwards and forwards in a straight line.

"cycle" as used in the present description and claims means: a part of the etching and collapsing process defined by one forth and one back movement of the furnace along the length of the deposited tube, or vice versa. The furnace starts at one end of the available length of the deposited tube, moves forth towards a reversal point near the other end of the available length of the deposited tube, and then moves back towards the first end to complete one cycle. A cycle may be a collapsing cycle in which collapsing takes place but no etching occurs; a cycle may be an etching cycle in which etching take place but no collapsing occurs; or a cycle may be an etching and collapsing cycle in which both etching and collapsing takes place simultaneously. The available length of the deposited tube is considered to be the length of the deposited tube over which the furnace may move, excluding both ends of the deposited tube that are mounted in the clamps of the lathe.

"soot" as used in the present description means: a glassy substance produced by incomplete vitrification of glass-forming compounds.

As noted, the present invention relates to a method for preparing a primary preform by etching and collapsing a deposited tube.

In the process of manufacturing optical fibers, after the inside vapor deposition process is finished, the deposited tube is mounted on a lathe. Normally, both ends of the deposited tube are fastened by clamps. For collapsing, the deposited tube is locally heated (by the hot zone of the furnace) until a sufficiently high temperature is reached to soften the glass. When the glass starts to soften, it assumes a smaller diameter and closes the central cavity. This process is carried out until the deposited tube is completely closed (i.e., until the cavity is no longer present).

Unfortunately, because of (i) high temperatures during this collapsing reaction and (ii) pollution coming both from the furnace (e.g., copper from copper elements, or iron, tungsten, nickel and/or chromium from the inoxidizable steel parts of the furnace), and from the environment, such as pollution present in the gases (e.g., hydrogen or methane), the outer glass surface of the primary preform is partly contaminated when such pollutants are entrapped in the glass upon cooling and solidifying. Moreover, soot already present on the deposited tube may cause bubbles in the glass upon collapsing. This contamination and/or bubbles may lead to increased attenuation in the optical fiber drawn from the primary preform. The present inventors have observed that contamination by metals, such as copper and iron, is especially detrimental and might lead to a large increase in attenuation within the 1310-nanometer band and/or the 1550-nanometer band.

The present inventors have discovered a method to minimize this effect by applying an etching procedure at the outside of the deposited tube during the collapsing process—either before, simultaneous with, or after the collapsing cycles. The present inventors have observed that the contamination during the start of the collapsing process is mainly present at or near the outer surface of the primary preform (e.g., the outer 0.3 millimeter of the primary preform). Moreover, without wishing to be bound to any particular theory, the present inventors have observed that, as the collapsing process proceeds, the contamination—especially the metal particles—tends to migrate radially through the glass more towards the center.

Methods of chemical wet etching, such as wet etching using HF, are known. Wet etching is carried out after the collapsing process has finished. Wet etching is undesirable because HF is a very dangerous acid, and it leaves the surface of the primary preform full of small dents and irregularities. The etching process after the collapsing process has finished might provide only limited results, because by means of such an etching procedure only the outer layer is removed, whereas the contamination might have migrated radially inwards. Moreover, wet etching is carried out after the collapsing process, which introduces an additional processing step, which is undesirable. In contrast, the present method allows for etching before and/or simultaneously with and/or after collapsing. This eliminates the need for an additional process step.

Etching the inside of the deposited tube in order to remove some of the deposited glass layers is known from European Patent No. 0,117,009. This European patent, which is hereby incorporated by reference in its entirety, uses a mixture of oxygen and fluorine-containing gas.

The inventors' solution to existing preform-related problems is to provide an in-situ, outside etching process in the lathe using a fluorine-containing etching gas (i.e., a fluorine-containing gas) before and/or simultaneously with and/or after the collapsing process. In other words, an etching process is combined with the collapsing process instead of occurring in a different device separately from the collapsing process. Furthermore, the present inventive method provides an etching process that employs an etching gas instead of wet etching.

As noted, in one aspect, the present invention relates to a method for preparing a primary preform by etching and collapsing a deposited tube. An exemplary method to obtain a primary preform includes mounting a deposited tube on a lathe and introducing the deposited tube into a central aperture of a furnace mounted on the lathe, wherein the furnace and the deposited tube are movable in axial direction with respect to each other, and creating within the furnace a hot zone that moves in translation back and forth over the length of the deposited tube during one or more cycles, wherein (i) during at least one cycle at least part of the outside of the deposited tube is etched by supplying a fluorine-containing etching gas to an annular region between the outer surface of the deposited tube and the central aperture of the furnace, and (ii) during at least one cycle the deposited tube is collapsed.

In an embodiment of this first aspect, this method includes the steps of mounting a deposited tube on a lathe and introducing the deposited tube into a central aperture of a furnace mounted on the lathe, wherein the furnace and the deposited tube are movable in axial direction with respect to each other, and creating within the furnace a hot zone that moves in translation back and forth over the length of the tube during one or more cycles, wherein (i) during at least one cycle at least part of the outside of the deposited tube is etched by supplying a fluorine-containing etching gas to an annular region between the outer surface of the deposited tube and the central aperture of the furnace, and (ii) subsequently, during at least one cycle the etched deposited tube is collapsed in order to obtain a primary preform.

In another embodiment of this first aspect, this method includes the steps of mounting a deposited tube on a lathe and introducing the deposited tube into a central aperture of a furnace mounted on the lathe, wherein the furnace and the deposited tube are movable in axial direction with respect to each other, and creating within the furnace a hot zone that moves in translation back and forth over the length of the tube during one or more cycles, wherein (i) during at least one cycle the deposited tube is collapsed, and (ii) simultaneously at least part of the outside of the deposited tube is etched by supplying a fluorine-containing etching gas to an annular region between the outer surface of the deposited tube and the central aperture of the furnace in order to obtain a primary preform.

In another embodiment of this first aspect, this method includes the steps of mounting a deposited tube on a lathe and introducing the deposited tube into a central aperture of a furnace mounted on the lathe, wherein the furnace and the deposited tube are movable in axial direction with respect to each other, and creating within the furnace a hot zone that moves in translation back and forth over the length of the tube during one or more cycles, wherein (i) during at least one cycle at least part of the outside of the deposited tube is etched by supplying a fluorine-containing etching gas to an annular region between the outer surface of the deposited tube and the central aperture of the furnace, and (ii) subsequently, during at least one cycle the deposited tube is collapsed and simultaneously at least part of the outside of the deposited tube is etched by supplying a fluorine-containing etching gas to the annular region between the outer surface of the deposited tube and the central aperture of the furnace in order to obtain a primary preform.

In another embodiment of this first aspect, this method includes the steps of mounting a deposited tube on a lathe and introducing the deposited tube into a central aperture of a furnace mounted on the lathe, wherein the furnace and the deposited tube are movable in axial direction with respect to each other, and creating within the furnace a hot zone that moves in translation back and forth over the length of the tube during one or more cycles, wherein (i) during at least one cycle the deposited tube is collapsed and simultaneously at least part of the outside of the deposited tube is etched by supplying a fluorine-containing etching gas to an annular region between the outer surface of the deposited tube and the central aperture of the furnace, and (ii) and subsequently during at least one cycle at least part of the outside of the primary preform thus obtained is etched by supplying a fluorine-containing etching gas to the annular region between the outer surface of the primary preform and the central aperture of the furnace.

The method according to the present invention usually includes several cycles in which the furnace or the deposited tube is moved with respect to the other. The furnace induces a zone of high temperature (a so-called "hot zone") on part of the length of the deposited tube. The hot zone is typically located in the axial middle of the furnace. Such a hot zone usually has a length of between 5 and 20 centimeters, typically between 7 and 15 centimeters, depending on the furnace used.

It should be noted there is a kind of a lag phase between the introduction of the fluorine-containing gas and the moment that it has an etching effect. The effect of this lag phase is the following: The etching is typically only observed—as empirically found by the present inventors—at an axial position that is the axial position at which the supply of the fluorine-containing gas is started plus approximately the width of the hot zone. Those having ordinary skill in the art will be able to determine the lag and adjust the starting point and end point of the addition of the fluorine-containing gas.

In an exemplary etching embodiment, the temperature of the hot zone to effect the etching process with the fluorine-containing gas is at least 1400° C., typically at least 1500° C. In an exemplary collapsing embodiment, the temperature of the hot zone to effect the collapsing process is at least 1700° C., typically at least 1800° C., more typically at least 1900° C. In other words, the etching process can take place at lower temperatures than the collapsing process. However, the etching may also be carried out at the higher temperature of the collapsing process.

Typically, the temperature of the furnace during a collapsing cycle or a simultaneous etching and collapsing cycle is set so that the contracting of the deposited tube takes place within the processing range of the glass composition in question. In particular, the temperature of the hot zone is typically below the melting point of the deposited support tube and above the softening temperature of the support tube. The combination of the temperature of the furnace and the movement of the furnace relative to the deposited tube, or vice versa, determines the temperature in the hot zone.

Where a cycle according to the present invention is an etching cycle, the temperature of the hot zone is typically at least 1400° C., typically at least 1500° C. Where a cycle according to the present invention is a collapsing cycle, the temperature of the hot zone is typically at least 1700° C., more typically at least 1800° C. (e.g., at least 1900° C.). Where a cycle according to the present invention is an etching and collapsing cycle, the temperature of the hot zone is typically at least 1700° C., typically at least 1800° C. (e.g., at least 1900° C.). In an embodiment, the maximum temperature of the hot zone is 2100° C., more typically 2050° C. (e.g., 2000° C.).

The furnace used for the etching and collapsing process may be any furnace suitable for that purpose, such as a high-temperature induction furnace or an electrical-resistance furnace. Typically, the furnace provides rotation-symmetrical heating of the deposited tube present in the central aperture of the furnace so as to prevent axial and radial stresses from occurring in the deposited tube. In an embodiment, the rotation-symmetrical heating is carried out by rotating the deposited tube inside the central aperture of the furnace.

The translational speed of movement of the furnace and/or the deposited tube with respect to the other is typically between 15 and 45 millimeters per second, more typically between 25 and 35 millimeters per second. The deposited tube is typically rotated around its axis with a rotational speed of at least 10 revolutions per minute, typically at least 15 revolutions per minute, such as between 20 and 35 revolutions per minute (e.g., 25 revolutions per minute).

The temperature of the hot zone ensures the process of etching will take place by disassociation of the fluorine-containing gas to fluorine ions. Without wishing to be bound by any theory, the inventors presume that these fluorine ions will react with the silica on the outside surface of the deposited tube to form $SiF_4$ and $CO_2$. In other words, $SiO_2$ is removed from the outside surface of the deposited tube and any impurities that are present inside of that glass will be freed, carried out with the stream of gas, and then removed from the outside surface and outer glass layers of the deposited tube.

The fluorine-containing gas may be present in the annular region or space between the central aperture furnace and the outside surface of the deposited tube over the length of the furnace (e.g., within the region of the hot zone and on both axial sides of the hot zone). However, only when the temperature is sufficient (e.g., at least 1400° C.) will there be a good effect of etching, which will be in the hot zone. Any fluorine-containing gas that is not activated to provide an etching effect will be removed from the furnace together with any gases formed during the etching process (e.g., $CO_2$ and $SiF_4$), such as by a decreased pressure duct or a vacuum pump located at one or both ends of the furnace. This ensures safe removal of any hazardous gases.

From International Publication No. WO02/40415 is known an apparatus and process for flushing the space between the heating element and the deposited tube with an inert gas. From U.S. Pat. No. 5,970,083 is known an apparatus having a graphite element. The apparatuses disclosed in these two publications, each of which is hereby incorporated by reference in its entirety, may be used in the method according to the present invention. Other apparatus may also be used in the method according to the present invention.

In an embodiment of the present invention, an induction furnace is used having a graphite liner that forms the inside surface of the furnace adjacent the central aperture and hence surrounds the annular region between the outside surface of the deposited tube and the central aperture of the furnace. The graphite liner may comprise a plurality of holes, and such an apparatus is known in the art, such as from the aforementioned U.S. Pat. No. 5,970,083. The fluorine-containing gas is typically supplied to the annular region through the holes in the graphite liner.

The fluorine-containing gas is supplied during at least a part of at least one cycle, typically during a complete or full cycle from the one end to the reversal point at the other end and back again. In an embodiment, the fluorine-containing gas is supplied only when the furnace (e.g., the hot zone) is between certain longitudinal positions between the ends of the available length or, for example, only during the forward movement or only during the back movement.

It should be noted that only the middle portion of a deposited tube is collapsed. This middle portion is called the "available length." The remaining parts on both sides are used to mount (e.g., to clamp) the deposited tube on the lathe. Alternatively, handles may be used to elongate the tube on both sides, and the elongated tube is mounted with both handles on the lathe.

The fluorine-containing gas is typically supplied in an amount of at least 100 sccm (standard cubic centimeter per minute) under standard conditions (20° C. and 1 atmosphere), more typically at least 150 sccm (e.g., 200 sccm or more). The fluorine-containing gas is typically supplied as a mixture with an inert gas, such as argon.

During a collapsing cycle, an inert gas is used to flush the annular region between the outside of the deposited tube and the inside of the furnace. The flow of the inert gas may be, for example, at least 20 slm (standard liter per minute), such as at least 30 slm, typically between 30 and 50 slm (e.g., 40 slm in a collapsing cycle).

In an etching cycle or a simultaneous etching and collapsing cycle, the total gas flow (either pure fluorine-containing gas(es) or a mixture of fluorine-containing gas(es) and an inert gas) is at least 20 slm (standard liter per minute), such as at least 30 slm, typically between 30 and 50 slm (e.g., 40 slm).

During an etching and collapsing cycle, the fluorine-containing gas is typically added into the inert gas, or part of the inert gas is replaced by the fluorine-containing gas. In other words, a mixture of a fluorine-containing gas and an inert flushing gas is used. However, the inert gas may also be completely replaced by one or more fluorine-containing gases. In an exemplary embodiment, a mixture of 200 sccm FREON ($C_2F_6$) in 40 slm argon is used.

In an embodiment, the amount of fluorine-containing gas is substantially the same during the cycle. In an embodiment, when the fluorine-containing gas is supplied during more than one cycle, the amount of the fluorine-containing gas is substantially the same during each cycle.

In an embodiment, the amount of fluorine-containing gas is variable during the cycle. In other words, the amount of fluorine-containing gas varies as a function of the axial position. For example, it may be reduced near the reversal point of the furnace.

In an embodiment, the etching step provides a primary preform having a reduced diameter as compared with a primary preform that would have undergone the same collapsing treatment without etching. In other words, the etching removes glass (silica) from the outer surface of the deposited tube and decreases the outer diameter thereof.

The decrease in outer diameter due to etching can be determined by a cross section area (CSA) measurement, namely by calculating the difference between the CSA of the deposited tube before collapsing and etching and the CSA of the primary preform obtained.

The cross-sectional area for the deposited tube ($CSA_{dp}$) can be calculated as follows:

$$CSA_{dp} = \frac{\pi}{4}(d_u^2 - d_i^2)$$

wherein $d_u$ is the outer diameter of the deposited tube and wherein $d_i$ is the inner diameter of the deposited tube.

The cross-sectional area for the primary preform ($CSA_p$) can be calculated as follows:

$$CSA_p = \frac{\pi}{4}(d_p^2)$$

wherein $d_p$ is the outer diameter of the primary preform.

The decrease in CSA by etching ($CSA_\Delta$) can be calculated as follows:

$$CSA_\Delta = CSA_{dp} - CSA_p = \left[\frac{\pi}{4}(d_u^2 - d_i^2)\right] - \left[\frac{\pi}{4}(d_p^2)\right]$$

In one embodiment, the decrease in CSA ($CSA_\Delta$) is at least 5 $mm^2$. In another embodiment, the decrease in CSA ($CSA_\Delta$) is at least 10 $mm^2$. In yet another embodiment, the decrease in CSA ($CSA_\Delta$) is at least 15 $mm^2$.

The present method is suitable for deposited tubes prepared to make either multimode optical fibers or single-mode optical fibers. Moreover, the present invention relates to a primary preform obtained by or obtainable by the present method. The present invention also relates to multimode optical fibers or single-mode optical fibers obtained therefrom.

The present methods do not require significant changes to the instrumental setup or apparatus that are already in use. Therefore, the inventors' solutions are easy and cost-effective to implement.

Aspects of the present invention will now be illustrated in the following non-limiting examples, which are provided for the sake of illustration and which are not intended to limit the scope of the present invention.

EXAMPLES

In order to demonstrate concepts of the present invention, two deposited tubes were subjected to the same collapsing cycles with and without an etching gas. The etching gas was only supplied during certain longitudinal positions of the furnace translating over a deposited tube to show the effect as well as a possible lag.

Comparative Example 1

A multimode deposited tube having an outer diameter of 46 millimeters was introduced into a collapsing lathe. Collapsing was carried out with an electrical-resistance furnace having a graphite liner with holes and providing a hot zone having a width of approximately 10 centimeters and a temperature of 2000° C. The furnace was moved over the deposited tube with a translation speed of 20 millimeters per minute. The deposited tube was rotated within the furnace with a rotational speed of 25 revolutions per second. The collapsing was performed in three collapsing cycles in which no etching gas was supplied. The remaining gases were removed by means of a line having a reduced pressure of approximately 0.9 bar. After the collapsing process, a solid rod (i.e. the primary preform) was obtained and subjected to a CSA measurement. A CSA value was obtained for each axial position. The $CSA_A$ was 0 $mm^2$.

Example 1

A multimode deposited tube having an outer diameter of 46 millimeters was introduced into a collapsing lathe. Collapsing was carried out with an electrical-resistance furnace having a graphite liner with holes and providing a hot zone having a width of approximately 10 centimeters and a temperature of 2000° C. The furnace was moved over the deposited tube with a translation speed of 20 millimeters per minute. The deposited tube was rotated within the furnace with a rotational speed of 25 revolutions per second. The collapsing was carried out in three simultaneous etching and collapsing cycles. FREON ($C_2F_6$) gas at 200 sccm and argon at 40 slm were introduced through the holes in the graphite liner when the furnace was between certain axial positions with respect to the start/stop position of the furnace. The remaining gases were removed by means of a line having a reduced pressure of approximately 0.9 bar. After the collapsing process, a solid rod (i.e., the primary preform) was obtained and subjected to a CSA measurement. A CSA value was obtained for each axial position. The CSA was 15 $mm^2$.

The CSA was considerably reduced for the primary preform according to Example 1 when etching was carried out between the axial positions. This shows that an exemplary etching process according to the present invention is able to remove part of the outer surface glass of the deposited tube during the collapsing process and simultaneously remove any impurities contained in the glass. A lag of approximately 100 millimeters was observed after the start and end of the addition of the fluorine-containing gas.

Example 2

A multimode deposited tube having an outer diameter of 46 millimeters was introduced into a collapsing lathe. Collapsing and etching were carried out with an electrical-resistance furnace having a graphite liner with holes and providing a hot zone having a width of approximately 10 centimeters and a temperature of 2000° C. for collapsing and a temperature of 1500° C. for etching. The furnace was moved over the deposited tube with a translation speed of 20 millimeters per minute. The deposited tube was rotated within the furnace with a rotational speed of 25 revolutions per second. The collapsing was carried out in two etching cycles and subsequently three collapsing cycles. During the etching cycles FREON ($C_2F_6$) gas at 200 sccm and argon at 40 slm were introduced through the holes in the graphite liner when the furnace was between certain axial positions with respect to the start/stop position of the furnace. The remaining gases were removed by means of a line having a reduced pressure of approximately 0.9 bar. After the collapsing process, a solid rod (i.e., the primary preform) having an overall outer diameter of approximately 34 millimeters was obtained and subjected to a CSA measurement. A CSA value was obtained for each axial position. The CSA was reduced for the primary preform according to Example 2 when etching was carried out between the axial positions. The CSA was 11 $mm^2$.

In the specification, typical embodiments of the invention have been disclosed. The present invention is not limited to such exemplary embodiments. The use of the term "and/or" includes any and all combinations of one or more of the associated listed items. Unless otherwise noted, specific terms have been used in a generic and descriptive sense and not for purposes of limitation.

The invention claimed is:

1. A method for preparing a primary preform by etching and collapsing a deposited tube, the method comprising the steps of:

mounting a deposited tube on a lathe and introducing the deposited tube into a central aperture of a furnace mounted on the lathe, wherein an inside surface of the furnace surrounds the central aperture of the furnace, and wherein the furnace and the deposited tube are movable in axial direction with respect to each other; and while the deposited tube is mounted on the lathe and positioned in the central aperture of the furnace so that the inside surface of the furnace surrounds the deposited tube, creating within the furnace a hot zone that moves in translation back and forth over the length of the deposited tube during one or more cycles, wherein the hot zone moves in translation back and forth by moving of the furnace over the deposited tube and/or by moving of the deposited tube inside of the central aperture of the furnace, whereby the outside of the deposited tube is contaminated by furnace contaminants, and:

(i) during at least one of the one or more cycles, removing at least some of the furnace contaminants by etching at least part of the outside of the deposited tube by supplying a fluorine-containing etching gas to an annular region between the deposited tube and the inside surface of the furnace while the deposited tube is mounted on the lathe and positioned in the central aperture of the furnace so that the inside surface of the furnace surrounds the deposited tube, and (ii) during at least one of the one or more cycles, collapsing the deposited tube while the deposited tube is mounted on the lathe and positioned in the central aperture of the furnace so that the inside surface of the furnace surrounds the deposited tube.

2. The method according to claim 1, comprising at least one etching cycle wherein the outside of the deposited tube is etched followed by at least one collapsing cycle wherein the deposited tube is collapsed.

3. The method according to claim 2, wherein a temperature of the hot zone during a collapsing cycle wherein the deposited tube is collapsed is at least 1700° C.

4. The method according to claim 1, comprising at least one etching and collapsing cycle wherein the outside of the deposited tube is etched and simultaneously collapsed.

5. The method according to claim 4, wherein a temperature of the hot zone during an etching and collapsing cycle wherein the deposited tube is etched and collapsed is at least 1700° C.

6. The method according to claim 1, comprising at least two cycles.

7. The method according to claim 1, wherein the fluorine-containing etching gas is supplied during at least part of each cycle.

8. The method according to claim 1, wherein the fluorine-containing etching gas comprises $C_2F_6$, $C_4F_8$, $CF_4$, $CCl_2F_2$, $SF_6$, $NF_3$, and/or $F_2$.

9. The method according to claim 1, wherein the fluorine-containing etching gas has an oxygen content of less than 1 ppm.

10. The method according to claim 1, wherein the fluorine-containing etching gas is mixed with an inert gas, the fluorine-containing etching gas and the inert gas having an oxygen content of less than 1 ppm.

11. The method according to claim 1, wherein the furnace and/or the deposited tube move with respect to one another at a translation speed of between 15 and 45 millimeters/second.

12. The method according to claim 1, comprising the step of preparing the deposited tube by inside chemical vapor deposition of a tube.

13. The method according to claim 1, wherein a temperature of the hot zone is at least 1400° C. during an etching cycle wherein the outside of the deposited tube is etched.

14. The method according to claim 1, wherein the annular region between the deposited tube and the inside surface of the furnace is substantially free of oxygen during the one or more cycles.

15. A method according to claim 1, wherein the step of collapsing the deposited tube yields a primary preform having an outer diameter, and comprising:
increasing the outer diameter of the primary preform by externally applying silica to form a final preform; and subsequently drawing the final preform into an optical fiber.

16. The method according to claim 1, wherein the furnace contaminants comprise iron, tungsten, nickel, and/or chromium from parts of the furnace.

17. The method according to claim 1, wherein:
the furnace comprises a liner that forms the inside surface of the furnace and surrounds the central aperture of the furnace;
the liner comprises a plurality of holes; and
supplying the fluorine containing etching gas comprises supplying the fluorine containing etching gas through the plurality of holes of the liner to the annular region between the deposited tube and the inside surface of the liner while the deposited tube is mounted on the lathe and positioned in the central aperture of the furnace so that the inside surface of the liner surrounds the deposited tube.

18. A method for preparing a primary preform by etching and collapsing a deposited tube, the method comprising the steps of:
mounting a deposited tube on a lathe and introducing the deposited tube into a central aperture of a furnace mounted on the lathe, wherein an inside surface of the furnace surrounds the central aperture of the furnace, and wherein the furnace and the deposited tube are movable in axial direction with respect to each other; and
while the deposited tube is mounted on the lathe and positioned in the central aperture of the furnace so that the inside surface of the furnace surrounds the deposited tube, creating within the furnace a hot zone that moves in translation back and forth over the length of the deposited tube during both:
(i) one or more etching cycles comprising removing furnace contaminants from the deposited tube by etching at least part of the outside of the deposited tube by supplying a fluorine-containing etching gas to an annular region between the deposited tube and the inside surface of the furnace, and
(ii) one or more collapsing cycles comprising collapsing the deposited tube,
wherein:
the hot zone moves in translation back and forth by moving of the furnace over the deposited tube and/or by moving of the deposited tube inside of the central aperture of the furnace,
a temperature of the hot zone during at least one of the one or more etching cycles is at least 1400° C.,
a temperature of the hot zone during at least one of the one or more collapsing cycles is at least 1700° C., and
at least one of the one or more etching cycles is followed by at least one of the one or more collapsing cycles.

19. The method according to claim 18, wherein fluorine-containing etching gas comprises $C_2F_6$, $C_4F_8$, $CF_4$, $CCl_2F_2$, $SF_6$, $NF_3$, and/or $F_2$.

20. A method for preparing a primary preform by etching and collapsing a deposited tube, the method comprising the steps of:
mounting a deposited tube on a lathe and introducing the deposited tube into a central aperture of a furnace mounted on the lathe, wherein an inside surface of the furnace surrounds the central aperture of the furnace, and wherein the furnace and the deposited tube are movable in axial direction with respect to each other; and
while the deposited tube is mounted on the lathe and positioned in the central aperture of the furnace so that the inside surface of the furnace surrounds the deposited tube, creating within the furnace a hot zone that moves in translation back and forth over the length of the deposited tube during a plurality of etching and collapsing cycles, the etching and collapsing cycles comprising (i) etching at least part of the outside of the deposited tube by supplying a fluorine-containing etching gas to an annular region between the deposited tube and the inside surface of the furnace so that furnace contaminants are removed from the outside of the deposited tube by decreasing cross-sectional area of the deposited tube by at least 5 mm², and (ii) simultaneously with the etching, collapsing the deposited tube, wherein a temperature of the hot zone during at least one of the plurality of etching and collapsing cycles is at least 1700° C., wherein the hot zone moves in translation back and forth by moving of the furnace over the deposited tube and/or by moving of the deposited tube inside of the central aperture of the furnace, and wherein the annular region between the deposited tube and the central aperture of the furnace is substantially free of oxygen during at least one of the etching and collapsing cycles.

21. The method according to claim 20, wherein fluorine-containing etching gas comprises $C_2F_6$, $C_4F_8$, $CF_4$, $CCl_2F_2$, $SF_6$, $NF_3$, and/or $F_2$.

* * * * *